United States Patent
Faibish et al.

(10) Patent No.: US 11,163,449 B2
(45) Date of Patent: Nov. 2, 2021

(54) ADAPTIVE INGEST THROTTLING IN LAYERED STORAGE SYSTEMS

(71) Applicant: EMC IP Holding Company LLC, Hopkinton, MS (US)

(72) Inventors: Sorin Faibish, Newton, MA (US); Istvan Gonczi, Berkley, MA (US); Ivan Bassov, Brookline, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 63 days.

(21) Appl. No.: 16/656,158

(22) Filed: Oct. 17, 2019

(65) Prior Publication Data

US 2021/0117099 A1 Apr. 22, 2021

(51) Int. Cl.
*G06F 3/06* (2006.01)
*G06F 12/0802* (2016.01)

(52) U.S. Cl.
CPC ............ *G06F 3/0608* (2013.01); *G06F 3/061* (2013.01); *G06F 3/0613* (2013.01); *G06F 3/0653* (2013.01); *G06F 3/0656* (2013.01); *G06F 3/0683* (2013.01); *G06F 12/0802* (2013.01)

(58) Field of Classification Search
CPC ....... G06F 3/0653; G06F 3/061; G06F 3/0613
See application file for complete search history.

(56) References Cited

U.S. PATENT DOCUMENTS

| | | | |
|---|---|---|---|
| 5,666,532 A | 9/1997 | Saks et al. | |
| 5,926,834 A | 7/1999 | Carlson et al. | |
| 6,256,634 B1 | 7/2001 | Moshaiov et al. | |
| 6,260,125 B1 | 7/2001 | McDowell | |
| 6,493,837 B1 | 12/2002 | Pang et al. | |
| 6,853,643 B1 | 2/2005 | Hann et al. | |
| 6,996,676 B2 | 2/2006 | Megiddo et al. | |
| 7,062,675 B1 | 6/2006 | Kemeny et al. | |
| 7,379,999 B1 | 5/2008 | Zhou et al. | |
| 7,500,048 B1 | 3/2009 | Venkitachalam et al. | |
| 7,640,264 B1 | 12/2009 | Chaulk et al. | |
| 7,752,663 B2 | 7/2010 | Nakakoji et al. | |
| 7,865,485 B2 | 1/2011 | Mullick et al. | |
| 7,870,372 B2 | 1/2011 | Kang et al. | |
| 8,112,557 B2 | 2/2012 | Wideman | |
| 8,271,692 B1 | 9/2012 | Dinh et al. | |

(Continued)

OTHER PUBLICATIONS

Daya, et al.; "Quest for High-Performance Bufferless NoCs with Single-Cycle Express Paths and Self-Learning Throttling"; 53nd ACM/EDAC/IEEE Design Automation Conference; Jun. 2016 (6 pages); ACM, Austin, TX.

(Continued)

*Primary Examiner* — David Yi
*Assistant Examiner* — Nicholas A. Paperno
(74) *Attorney, Agent, or Firm* — BainwoodHuang

(57) ABSTRACT

A method of accepting writes in a multilayered storage system is provided. The method includes (a) monitoring a rate of flushing of data from a first data storage component to a second data storage component; (b) setting an intake rate for the first data storage component based on the monitored flushing rate; and (c) throttling writes to the first data storage component based on the set intake rate. An apparatus, system, and computer program product for performing a similar method are also provided.

12 Claims, 3 Drawing Sheets

(56) References Cited

U.S. PATENT DOCUMENTS

| | | |
|---|---|---|
| 8,275,945 B2 | 9/2012 | Tzeng |
| 8,429,352 B2 | 4/2013 | Sinclair |
| 8,468,318 B2 | 6/2013 | Colgrove et al. |
| 8,935,484 B2 | 1/2015 | Chang et al. |
| 9,003,168 B1 | 4/2015 | Jouppi et al. |
| 9,055,033 B2 | 6/2015 | Mergener |
| 9,075,735 B2 | 7/2015 | Tomlinson et al. |
| 9,104,599 B2 | 8/2015 | Atkisson et al. |
| 9,164,891 B2 | 10/2015 | Karamcheti et al. |
| 9,201,802 B1 | 12/2015 | Armangau et al. |
| 9,229,864 B1 | 1/2016 | Kanteti et al. |
| 9,280,467 B1 | 3/2016 | Kanteti et al. |
| 9,329,890 B2 | 5/2016 | Busaba et al. |
| 9,413,778 B1 | 8/2016 | Elisha |
| 9,720,596 B1 | 8/2017 | Bono et al. |
| 9,747,222 B1 | 8/2017 | Armangau et al. |
| 9,779,023 B1 | 10/2017 | Armangau et al. |
| 9,898,407 B2 | 2/2018 | Ambroladze et al. |
| 9,916,244 B1 | 3/2018 | Tolvanen et al. |
| 9,934,163 B1 | 4/2018 | Armangau et al. |
| 10,102,144 B2 | 10/2018 | Sundararaman et al. |
| 10,114,829 B1 | 10/2018 | Bono et al. |
| 10,268,381 B1 | 4/2019 | Armangau et al. |
| 10,380,026 B2 | 8/2019 | Sundararaman et al. |
| 10,552,322 B2 | 2/2020 | Hu et al. |
| 10,664,401 B2 | 5/2020 | Xu et al. |
| 10,761,756 B1 | 9/2020 | Bassov et al. |
| 10,817,421 B2 | 10/2020 | Talagala et al. |
| 10,838,626 B2 | 11/2020 | Jia et al. |
| 2004/0181594 A1* | 9/2004 | Suleiman ............. H04L 69/329 709/225 |
| 2007/0022264 A1* | 1/2007 | Bromling ............ H04L 67/1097 711/162 |
| 2013/0100811 A1* | 4/2013 | Watanabe ............... H04L 47/29 370/235 |
| 2015/0347305 A1 | 12/2015 | Li |
| 2016/0313944 A1* | 10/2016 | Hodgdon .............. G06F 3/0647 |
| 2018/0188952 A1* | 7/2018 | Carlton ................... G06F 3/061 |
| 2019/0369904 A1* | 12/2019 | Imamura ................ G06F 1/324 |
| 2020/0133870 A1 | 4/2020 | Zhang et al. |
| 2020/0133875 A1 | 4/2020 | Jia et al. |
| 2020/0285514 A1* | 9/2020 | Ghare ...................... G06F 9/50 |

OTHER PUBLICATIONS

Hanson, et al.; "What computer architects need to know about memory throttling"; Proceedings of the 2010 international conference on Computer Architecture; Jun. 2010; pp. 233-242. Version provided is from WEED 2010 (7 pages).

* cited by examiner

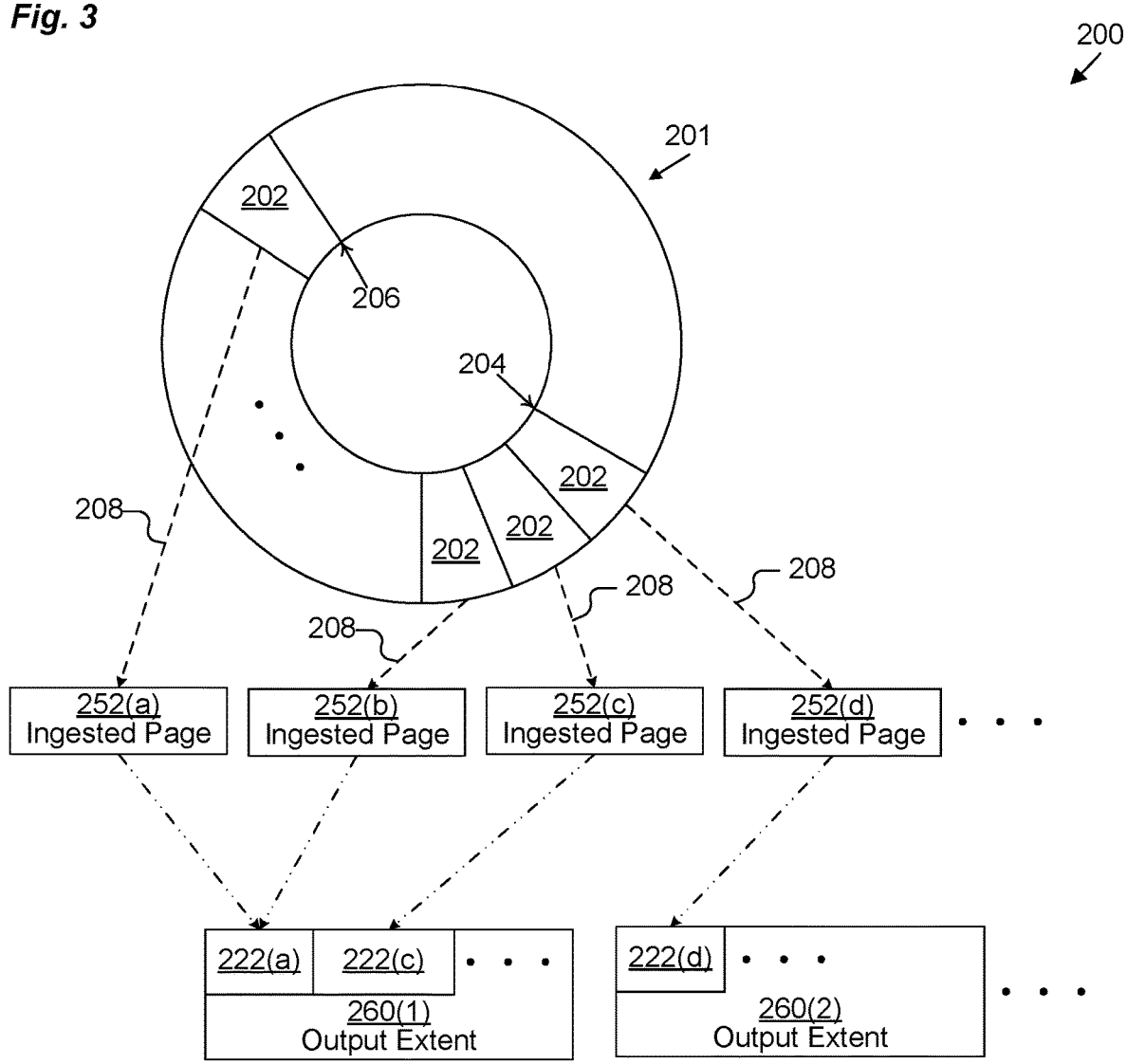

ADAPTIVE INGEST THROTTLING IN LAYERED STORAGE SYSTEMS

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems are arranged in layers. For example, a storage driver stack may include several drivers that are arranged in order such that write commands arrive at an upper-level driver and, after some initial processing, pass to a next level driver, and then to another, until a lowest-level driver is reached. In some systems, different drivers are associated with different parts of physical storage, such as cache and persistent storage.

The foregoing background is presented for illustrative purposes to assist the reader in readily understanding the background in which the invention was developed. However, the foregoing background is not intended to set forth any admission that any particular subject matter has the legal effect of prior art.

SUMMARY

Conventional layered storage systems may operate suboptimally when the rate at which data is received by a particular layer exceeds the rate at which the data can be flushed to a next layer. Although rate mismatches may be acceptable for short bursts, a layer may reach a maximum data buffering capacity if the mismatch continues, causing the layer to stop accepting further data. Some systems handle rate mismatches by utilizing a high watermark, so that, once a layer has reached a specified percentage of its capacity (e.g., 75%), throttling is applied to incoming writes to that layer, slowing an ingest rate of that layer until data can be flushed to the next layer. Throttling may be accomplished by introducing delays in acknowledgements to write commands received from a higher layer, such as from a host. Because throttling is usually applied when a layer is already almost full, some write commands may experience significant delays, while others may experience virtually none. Thus, these solutions suffer from "unfairness," meaning that some writes are penalized much more than others. In addition, significant delays may lead to unacceptable results; for example, certain network filesystems may unmount a drive if a large delay is encountered.

Thus, it would be desirable to operate a multi-layered storage system with an adaptive throttling scheme that does not suffer from inconsistent delays and/or unfairness. This result may be accomplished by monitoring the flushing rate of a layer and using the monitored flushing rate to adaptively set a maximum intake rate for that layer going forward. If the actual intake rate begins to exceed the set maximum intake rate, throttling can be applied so that the actual intake rate returns below the set maximum intake rate. The throttling may be rate-based and implemented with fine granularity, allowing short or moderate delays to be utilized in most cases. In some embodiments, the monitored flushing rate may be used, with adjustments, to yield the set intake rate, such as, for example, by taking the flushing rate and using it with upward adjustment based on a data reduction ratio achieved by processing within the layer. As another example, the flushing rate may be taken and used with upward adjustment up in the event that additional capacity (e.g., processing capacity, storage bus capacity, etc.) is not fully-utilized.

In one embodiment, a method of accepting writes in a multilayered storage system is provided. The method includes (a) monitoring a rate of flushing of data from a first data storage component to a second data storage component; (b) setting an intake rate for the first data storage component based on the monitored flushing rate; and (c) throttling writes to the first data storage component based on the set intake rate. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 3 is a block diagram depicting an example data structure arrangement for use in connection with various embodiments.

DETAILED DESCRIPTION OF THE INVENTION

Embodiments are directed to techniques for operating a multi-layered storage system with an adaptive throttling scheme that does not suffer from inconsistent delays and/or unfairness. This result may be accomplished by monitoring the flushing rate of a layer, and using the monitored flushing rate to adaptively set a maximum intake rate for that layer going forward. If the actual intake rate begins to exceed the set maximum intake rate, throttling can be applied so that the actual intake rate returns below the set maximum intake rate. The throttling may be rate-based and implemented with fine granularity, allowing short or moderate delays to be utilized in most cases. In some embodiments, the monitored flushing rate may be used, with adjustments, to yield the set intake rate, such as, for example, by taking the flushing rate and using it with upward adjustment based on a data reduction ratio achieved by processing within the layer. As another example, the flushing rate may be taken and used with upward adjustment up in the event that additional capacity (e.g., processing capacity, storage bus capacity, etc.) is not fully-utilized.

Figure 1:
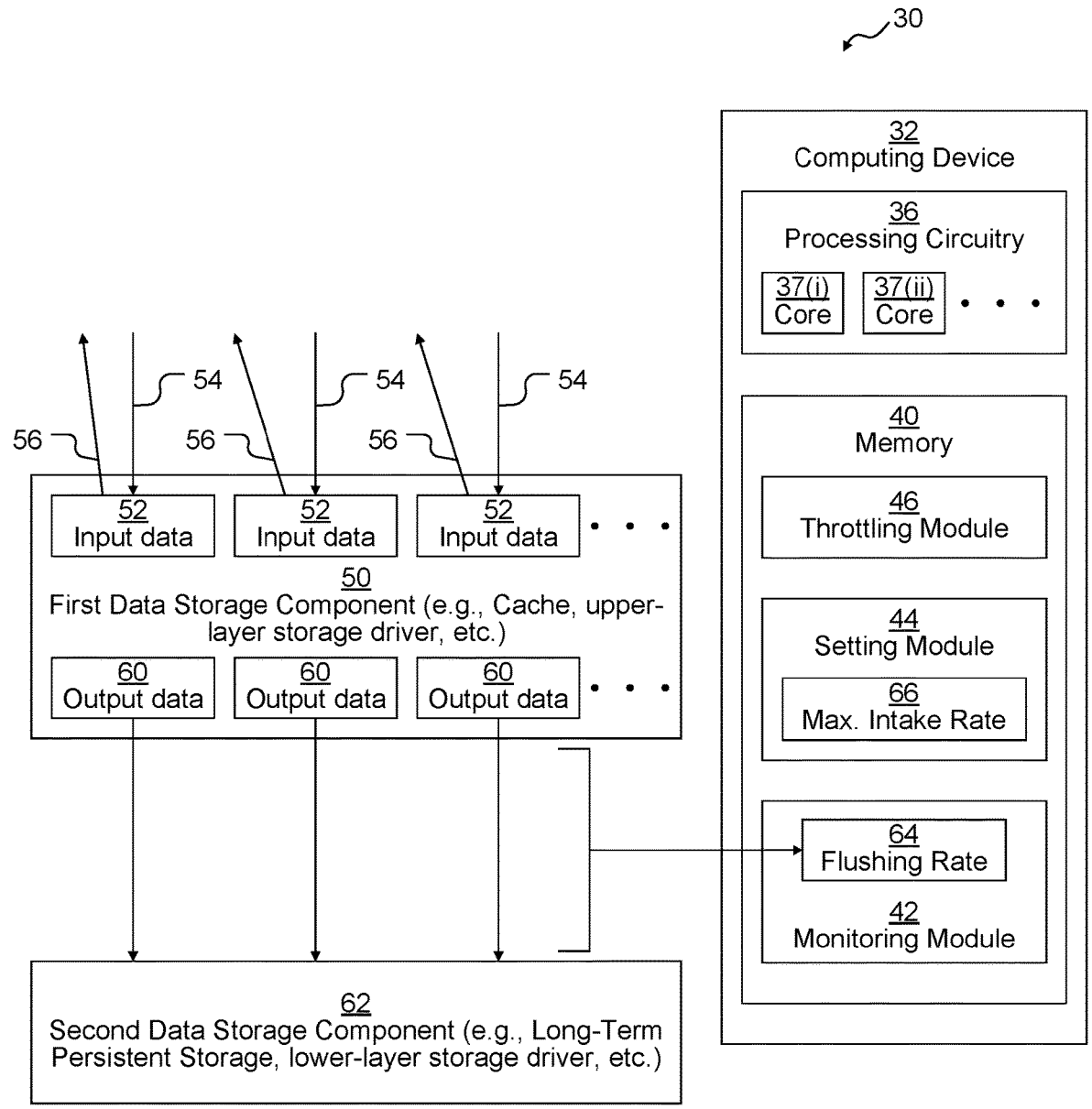
FIG. 1 is a block diagram depicting an example system, apparatus, and data structure arrangement for use in connection with various embodiments.

FIG. 1 depicts an example data storage system (DSS) 30. DSS 30 may include one or more computing devices 32. Each computing device 32 may be any kind of computing device or collection (or cluster) of computing devices, such as, for example, a personal computer, workstation, server computer, enterprise server, data storage array device, laptop computer, tablet computer, smart phone, mobile computer, etc.

Each computing device 32 at least includes processing circuitry 36 and memory 40. In some embodiments, a computing device 32 may also include persistent storage as well as various kinds of interfaces (not depicted). Computing device 32 also includes interconnection circuitry.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. As depicted processing circuitry 36 includes a plurality of processing cores 37 (depicted as cores 37(i), 37(ii), . . . ).

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a monitoring module 42, a setting module 44, a throttling module 46, and other software modules which each execute on processing circuitry 36. Memory 40 may also store various other data structures used by the OS, monitoring module 42, setting module 44, throttling module 46, and various other applications (not depicted).

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 32 is powered off. The OS, applications, monitoring module 42, setting module 44, and throttling module 46 are typically stored in this persistent storage portion of memory 40 so that they may be loaded into a system portion of memory 40 upon a system restart or as needed. The monitoring module 42, setting module 44, and throttling module 46, when stored in non-transitory form either in the volatile portion of memory 40 or in persistent portion of memory 40, each form a computer program product. The processing circuitry 36 running one or more applications thus forms a specialized circuit constructed and arranged to carry out the various processes described herein.

DSS 30 also includes a first data storage component 50 and a second data storage component 62. In some embodiments, first data storage component 50 is a cache (e.g., made up of nonvolatile memory or mirrored or battery-backed volatile memory) and second data storage component 62 is persistent storage configured for long-term or medium-term storage (e.g., for storage meant to last for days or longer). This persistent storage may include any kind of persistent storage devices, such as, for example, hard disk drives, solid-state storage devices (SSDs), flash drives, etc. Storage interface circuitry (not depicted) controls and provides access to the persistent storage. Storage interface circuitry may include, for example, SCSI, SAS, ATA, SATA, FC, M.2, and/or other similar controllers and ports.

In other embodiments, first data storage component 50 is an upper-layer driver in an I/O driver stack, while second data storage component 62 is a lower-layer driver in the I/O driver stack. In these embodiments, first data storage component 50 is typically a buffered driver that is able to temporarily store a limited amount of data, typically subject to a capacity limit. In yet other embodiments, data storage components 50, 62 may be other layers of storage in a set of layers of storage.

In some embodiments, data storage components 50, 62 may be part of computing device 32, while in other embodiments, one or both of data storage components 50, 62 may be located on another computing device or apparatus (e.g., a data storage array) separate from the computing device 32.

In operation, first data storage component 50 receives commands 54 that include respective input data 52. In some embodiments, the input data 52 of each write command may be a page or block of data. In some of these embodiments, each page or block has a standardized size (e.g., 4 kilobytes, 8 kilobytes, etc.), although in other embodiments, various block sizes may be allowed. In some embodiments, processing circuitry 36 operates to transform input data 52 into output data 60, which is in a form ready to be sent down to the second data storage component 62. For example, processing circuitry 36 may perform compression, deduplication, and or reordering/reorganization (e.g., placing in address order) operations on the input data 52 to yield output data 60. In some embodiments, output data 60 may be an extent of data that is able to hold around 1,000 compressed blocks (e.g., output data 60 may be arranged as extents 2 megabytes in size). Thus, the input data 52 may be altered (e.g., compressed) and reorganized to become output data 60. However, the first data storage component 50 only has a limited capacity, so the output data 60 must be flushed down to the second data storage component 62 at some point. In some embodiments, every so often (e.g., every 1 second or 10 seconds), a flushing operation operates to flush some of the output data 60 down to the second data storage component 62, at which point its space within the first data storage component 50 may be freed for new input data 52. In some embodiments, all output data 60 that has been placed into complete form (e.g., containing a maximum number of compressed pages that have been placed in the correct order) is flushed during each flushing cycle. In other embodiments, a least-recently-used or least-recently-accessed list is used to only flush some of the output data 60 in a cycle.

Regardless, over the course of a cycle, monitoring module 42 monitors the flushing activity to calculate a flushing rate 64. For example, in a 10-second cycle, thirty 2-megabyte (MB) extents of output data 60 may be flushed, which might yield a flushing rate 64 of 6 MB per second.

After each flushing cycle, setting module 44 may operate to generate a maximum intake rate 66 based on the monitored flushing rate. In some embodiments, the intake rate 66 may be set to be equal to the flushing rate 64. In some embodiments, the flushing rate 64 is multiplied by an average data reduction ratio (i.e., the average factor by which data is reduced during processing from input data 52 to output data 60) to yield the maximum intake rate 66. Thus, given a flushing rate 64 equal to 6 MB per second, the maximum intake rate 66 may be set to be 24 MB per second, assuming an average data reduction ratio of 4 times. In some embodiments, the flushing rate 64 is divided by a utilization of processing and/or storage resources to yield the maximum intake rate 66. Thus, for example, if only 1/10 of available resources during a flushing cycle are used to flush output data 60 to the second data storage component 62, then ten times more output data 60 could have been flushed were there a need to do so. Therefore, given a flushing rate 64 equal to 6 MB per second, the maximum intake rate 66 may be set to be 60 MB per second. In some embodiments, the flushing rate 64 is both multiplied by an average data reduction ratio and divided by a utilization of processing and/or storage resources to yield the maximum intake rate 66. Thus, using the values from the above examples, the maximum intake rate 66 may be set to be 240 MB per second.

Afterwards, in a next intake cycle (which may or may not coincide with the flushing cycles), throttling module 46 operates to throttle the incoming write commands 54 so that the input data 52 is received, on average, no faster than the set maximum intake rate 66. In some embodiments, this may be achieved by monitoring the average intake rate and applying delays if it gets too high. In an example, the maximum intake rate 66 is set to 240 MB per second and the intake cycle is 10 seconds long; if, after 2 seconds more than 480 MB (e.g., 520 MB) of input data 52 have been received, then throttling module 46 applies delays to the incoming write commands so that the intake rate over the rest of the intake cycle is reduced. Since applying an average rate of 240 MB per second over 10 seconds yields 2400 MB, no more than 2400−520=1880 MB should be received over the rest of the cycle (average intake rate drops from 260 MB per second over the first two seconds to no more than 235 MB per second over the last eight seconds). This may be accomplished by delaying sending an acknowledgment signal 56 back to the initiating host or application for each write command. That works to slow the intake rate because an initiating host or application will refrain from sending subsequent write commands 54 until a previous write command 54 has been acknowledged. Since the rate only needs to be slowed by a small amount, only a small amount of delay in returning each acknowledgment signal 56 is needed (e.g., 5 milliseconds). In other embodiments, throttling module 46 applies throttling using techniques other than application of delays Computing device 32 may also include network interface circuitry (not depicted), which may include one or more Ethernet cards, cellular modems, Fibre Channel (FC) adapters, Wireless Fidelity (Wi-Fi) wireless networking adapters, and/or other devices for connecting to a network (not depicted).

Figure 2:
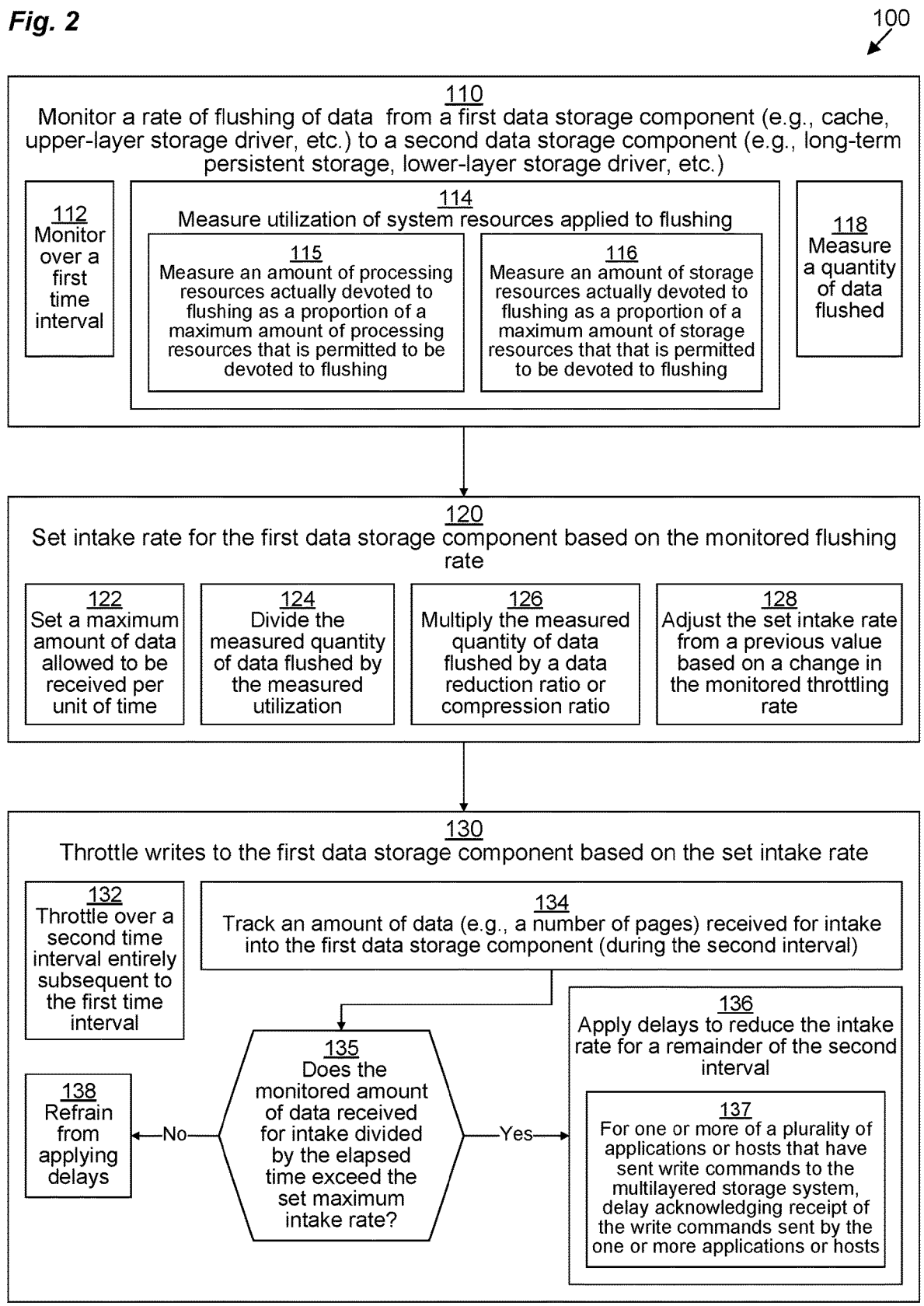
FIG. 2 is a flowchart depicting example methods of various embodiments.

FIG. 2 illustrates an example method 100 performed by DSS 30 for operating a multi-layered storage system with an adaptive throttling scheme. It should be understood that any time a piece of software (e.g, monitoring module 42, setting module 44, throttling module 46) is described as performing a method, process, step, or function, what is meant is that a computing device 32 on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order.

In step 110, monitoring module 42 monitors a rate of flushing (i.e., the flushing rate 64) of data (e.g., output data 60) from a first data storage component 50 (e.g., a cache, an upper-layer storage driver, etc.) to a second data storage component 62 (e.g., long-term persistent storage, a lower-layer storage driver, etc.). In some embodiments, step 110 includes sub-step 112, 114, and/or 118. In sub-step 112, the monitoring is performed over a first time interval (i.e., a flushing interval). The flushing rate 64 over each flushing interval is recorded and then used in step 120.

In sub-step 114, the monitoring module 42 also measures a utilization of system resources that are applied to flushing (e.g., during the flushing interval). In some embodiments, this may include (sub-step 115) measuring an amount of processing resources actually devoted to flushing as a percentage of a maximum amount of processing resources that is permitted to be devoted to flushing. For example, if the flushing interval is ten seconds long and up to ten cores 37 are permitted to be assigned to performing flushing operations, then the number of seconds during which each core 37 performs flushing may be measured and summed, dividing by the maximum of 100 core-seconds. Thus, if one core 37(*i*) spends 2 seconds flushing, and a second core 37(*ii*) spends 2.5 seconds flushing, the utilization ratio may be calculated as (2+2.5)/100=4.5%. It should be understood that this calculation is presented by way of example only. In some embodiments, rather than the flushing being the limiting factor in the speed of emptying out the first data storage layer 50, the processing of input data 50 into output data 60 (e.g., compressing, deduplicating, and reordering) may be the limiting factor, in which case the utilization of cores dedicated to processing input data 50 into output data 60 may be measured, or it may be some combination of the utilization of flushing and processing input data 50 into output data 60.

In some embodiments, instead of measuring the utilization of cores 37 in step 115, monitoring module 42 may instead (sub-step 116) measure an amount of storage resources actually devoted to flushing as a percentage of a maximum amount of storage resources that that is permitted to be devoted to flushing. For example, the utilization of a storage bus and/or the utilization of storage device transaction rates (e.g., in I/Os per second) of the second data storage component 62 may be measured. In some embodiments, sub-steps 115 and 116 may be combined, using whichever yields a more limiting result. For example, if the processing utilization is 4.5%, but the utilization of storage device transaction rates is 25%, then the utilization of storage utilization device transaction rates value would be used instead.

Step 110 also includes sub-step 118, in which monitoring module 42 measures the quantity of data (e.g., output data 60) flushed from the first data storage component 50 (e.g., during the flushing interval).

Then, in step 120, which may be performed after the conclusion of a flushing interval, the setting module 44 sets the maximum intake rate 66 for the first data storage component 50 based on the monitored flushing rate 64. In some embodiments, this means (sub-step 122) setting a maximum amount of data (e.g., input data 52) allowed to be received into the first data storage component 50 per unit time, on average.

In some embodiments, step 120 includes sub-step 124 and/or sub-step 126. In sub-step 124, the measured amount of data (e.g., output data 60) flushed or the flushing rate 64 is adjusted up based on the utilization ratio measured in sub-step 114 (if the utilization ratio is less than 100%), such as by dividing the measured amount of data flushed or the flushing rate 64 by the utilization ratio. In sub-step 126, the measured amount of data (e.g., output data 60) flushed or the flushing rate 64 is adjusted up based on a data reduction ratio or a compression ratio achieved between the input data 52 and the output data 60, such as by multiplying the measured amount of data flushed or the flushing rate 64 by the data reduction ratio or compression ratio. The compression ratio takes into account the reduction in size due to compression while the data reduction ration takes into account the reduction in size due to both compression and deduplication. In some embodiments, the data reduction ratio and/or compression ratio may be measured directly, while in others it may be estimated (such as by using regression or machine learning based on various inputs) or approximated (such as by assuming a typical data reduction ratio or compression ratio, such as a value of 4 or 6, for example).

In some embodiments, step 120 includes sub-step 128. In sub-step 128, the maximum intake rate 66 is not set directly from the measured flushing rate 64. Rather, whatever value the maximum intake rate 66 was set to previously is adjusted up or down based on whether the measured flushing rate 64 has gone up or down (in some embodiments as corrected by sub-steps 124, 126). In some embodiments, this may be done by measuring (as part of step 110) a latency with which various writes from the first data storage component 50 to the second data storage component 62 were accomplished, and if the latency has increased from a previous time interval, decreasing the maximum intake rate 66. Conversely, if the latency has decreased from a previous time interval, sub-step 128 would instead increase the maximum intake rate 66. Then, in step 130, throttling module 46 throttles writes 54 to the first data storage component 50 based on the set maximum intake rate 66. In some embodiments (sub-step 132), throttling module 46 performs this throttling over a second time interval (i.e., a throttling interval) entirely subsequent to the first time interval (i.e., the flushing interval). In some embodiments, the throttling interval may be of the same length as the flushing interval, but in other embodiments it may be shorter or longer. If the throttling interval is the same length as the flushing interval, it may coincide exactly with the following flushing interval or the one after that, or it may be offset from the flushing intervals.

In some embodiments, step 130 may include sub-steps 134-138. In step 134, throttling module 46 tracks an amount of input data 52 (e.g., by measuring a number of pages or blocks) received for intake into the first data storage component 50 (e.g., during the throttling interval). This tracking may be performed throughout the throttling interval. For example, if the throttling interval is 10 seconds long, the amount of data may be measured every second or at a finer granularity. Then (after each measurement), in sub-step 135, throttling module 46 determines whether or not the monitored amount of data received for intake divided by the elapsed time exceed the set maximum intake rate. If not, operation proceeds with sub-step 138 in which throttling module 46 refrains from applying delays to incoming write commands 54 (at least until a subsequent performance of sub-step 135 yields an affirmative result). If sub-step 135 yields an affirmative result, then operation proceeds with sub-step 136. In sub-step 136, throttling module 146 applies delays to reduce the intake rate (e.g., for the remainder of the throttling interval). In some embodiments, sub-step 136 includes sub-step 137, in which throttling module 46, for one or more of a plurality of applications or hosts that have sent write commands 54 to the DSS 30, delays returning acknowledgment signals 56 in response to the write commands 54 sent by the one or more applications or hosts, which causes those applications or hosts to refrain from sending further write commands 54 for the amount of the delay.

FIG. 3 depicts an example arrangement 200 of first data storage component 50, according to some embodiments. Arrangement 200 includes a ring buffer 201 stored in cache (or in buffered memory of a storage driver). Ring buffer 201 includes a set of metadata entries 202 that each include information about respective write commands 54 that have been received, such as a pointer 208 to an ingested page 252 (depicted as ingested pages 252(a), 252(b), 252(c), 252(d), ...) of input data 52 and a logical address where that data is supposed to be stored (e.g., a logical block address within a logical disk). As write commands 54 are received, new metadata entries 202 are added to a head 204 of the ring buffer 201, and as the metadata entries 202 are processed (e.g., their respective ingested pages 252 are moved to output extents 260), old metadata entries 202 are removed from a tail 206 of the ring buffer 201.

A core assignment 237 may assign various cores 37 of the computing device 32 to different tasks. Thus, as depicted, core 37(i) is assigned to perform intake of write commands 54 into the ring buffer 201 and associated ingested pages 252. Cores 37(ii), 37(iii) are assigned to process ingested pages 252 for conversion into compressed pages 222 that are placed into output extents 260. Cores 37(iv), 37(v) are assigned to flush output extents 260 down to the second data storage component 62. Core 37(vi) is assigned as idle. The assignment of cores 37 may change over time, although there may be a maximum number of cores 37 permitted to be assigned to any single type of task at any given time.

As depicted, ingested page 252(a) is compressed into compressed page 222(a) and stored in output extent 260(1). Ingested page 252(b) happens to be identical to ingested page 252(a), so deduplication is performed. Thus compressed page 222(a) also represents ingested page 252(b). Ingested page 252(c) is compressed into compressed page 222(c) and stored in output extent 260(1). Ingested page 252(d) is compressed into compressed page 222(d) and stored in output extent 260(2).

When an output extent 260 has become filled with compressed pages 222 (although, in some embodiments, uncompressed pages may also be stored in output extents 260 if they are not compressible), such that there is no more room in that output extent 260 for additional compressed pages 222, that output extent 260 becomes eligible for flushing. In some embodiments, all eligible output extents 260 are flushed during the next flushing interval (if possible). In other embodiments, a minimum number of output extents 260 may be retained in cache at all times with the output extents 260 that have been accessed (either for read or write) most recently being prioritized for retainment (e.g., using a least-recently accessed linked list to schedule output extents 260 for flushing).

The ratio of the size of the received ingested pages 252 in comparison to the final size of all the output extents 260 that represent those ingested pages 252 is the data reduction ratio achieved for that data. In the long-term, this ratio should be roughly constant, although there may be fluctuations in the short-term based on the type of data received and other factors. It may be calculated continuously or repeatedly for each flushing interval, or it may be estimated over the course of one or more flushing intervals for use in future throttling intervals. It may also be approximated.

Thus, techniques have been presented for operating a multi-layered storage system 30 with an adaptive throttling scheme that does not suffer from significant delays and/or unfairness. This result may be accomplished by monitoring the flushing rate 64 of a layer 50 and using the monitored flushing rate 64 to adaptively set a maximum intake rate 66 for that layer 50 going forward. If the actual intake rate begins to exceed the set maximum intake rate 66, throttling can be applied so that the actual intake rate returns below the set maximum intake rate 66. The throttling may be rate-based and implemented with fine granularity, allowing short or moderate delays to be utilized in most cases. In some embodiments, the monitored flushing rate 64 may be used, with adjustments to yield the set maximum intake rate 66, such as, for example, by taking the flushing rate 66 and using it with upward adjustment based on a data reduction ratio achieved by processing within the layer 50. As another example, the flushing rate 66 may be taken and used with upward adjustment in the event that additional capacity (e.g., processing capacity, storage bus capacity, etc.) is not fully-utilized.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

What is claimed is:

1. A method of accepting writes in a multilayered storage system, the method comprising:
   monitoring, during a first time interval, a rate of flushing of data from a first data storage component to a second data storage component;
   setting an intake rate for the first data storage component based on the monitored flushing rate, including:
     setting the intake rate to be higher than the monitored rate of flushing at least based on a data reduction rate achieved with respect to the second data storage component being larger than unity and
     setting a maximum amount of data allowed to be received by the first data storage component per unit of time; and
   throttling writes to the first data storage component based on the set intake rate, including limiting writes to the first data storage component to ensure that an amount of data received by the first data storage component does not, on average, exceed the set intake rate, including:
     during a second time interval entirely subsequent to the first time interval, tracking an amount of data received for intake into the first data storage component, the second time interval beginning immediately after the first time interval, the first and second time intervals being of equal length;
     comparing the tracked amount to an elapsed time within the second time interval; and
     in response to detecting that an average of the tracked amount received for intake over the elapsed time exceeds the set intake rate, applying delays to data received by the first data storage component for a remainder of the second time interval.

2. The method of claim 1,
   wherein tracking the amount of data received for intake into the first data storage component includes tracking a number of pages received for intake into the first data storage component as part of write commands issued by one or more applications; and
   wherein applying delays includes delaying sending acknowledgments to applications that sent pages received by the first data storage component for the remainder of the second time interval, each application being configured to refrain from sending further data blocks until receiving an acknowledgment of an immediately-previous data block.

3. The method of claim 1 wherein monitoring includes measuring, over the first time interval, both a utilization of system resources applied to flushing during the first time interval and a quantity of data flushed during the first time interval.

4. The method of claim 3 wherein setting the intake rate further includes setting the intake rate to be greater than the monitored rate of flushing also based on the measured utilization being lower than unity.

5. The method of claim 3 wherein measuring the utilization over the first time interval includes measuring an amount of processing resources actually devoted to flushing during the first time interval as a percentage of a maximum amount of processing resources that is permitted to be devoted to flushing.

6. The method of claim 3 wherein measuring the utilization over the first time interval includes measuring an amount of storage resources actually devoted to flushing during the first time interval as a percentage of a maximum amount of storage resources that is permitted to be devoted to flushing.

7. The method of claim 1 wherein the first data storage component is a cache and the second data storage component is long-term persistent storage.

8. A method of accepting writes in a multilayered storage system, the method comprising:
   monitoring a rate of flushing of data from a first data storage component to a second data storage component, wherein the first data storage component is a buffered storage driver;
   setting an intake rate for the first data storage component based on the monitored flushing rate, including setting the intake rate to be higher than the monitored rate of flushing at least based on a data reduction rate achieved with respect to the second data storage component being larger than unity; and throttling writes to the first data storage component based on the set intake rate.

9. A computer program product comprising a non-transitory computer-readable storage medium storing instructions, which, when executed by a computing device cause the computing device to accept writes in a multilayered storage system by:

monitoring a rate of flushing of data from a buffered storage driver to a data storage component;

setting an intake rate for the buffered storage driver based on the monitored flushing rate, including setting the intake rate to be higher than the monitored rate of flushing at least based on a data reduction rate achieved with respect to the data storage component being larger than unity; and throttling writes to the buffered storage driver based on the set intake rate.

10. A multilayered storage system comprising a computing device configured to:

monitor a rate of flushing of data from a buffered storage driver of the multilayered storage system to a data storage component of the multilayered storage system;

set an intake rate for the buffered storage driver based on the monitored flushing rate, including setting the intake rate to be higher than the monitored rate of flushing at least based on a data reduction rate achieved with respect to the data storage component being larger than unity; and throttle writes to the buffered storage driver based on the set intake rate.

11. The computer program product of claim 9, wherein:

the buffered storage driver is an upper-layer driver in an I/O driver stack; and the data storage component is a lower-layer driver in the I/O driver stack.

12. The method of claim 1 wherein the equal length of the first and second time intervals is within a range of 1 second to 10 seconds.

* * * * *